United States Patent [19]

Spainhour

[11] 4,317,667
[45] Mar. 2, 1982

[54] METHOD AND APPARATUS FOR FABRICATING LIGHTGUIDE PREFORMS

[75] Inventor: Carroll D. Spainhour, Princeton Township, Mercer County, N.J.

[73] Assignee: Western Electric Co., Inc., New York, N.Y.

[21] Appl. No.: 222,427

[22] Filed: Jan. 5, 1981

[51] Int. Cl.$^3$ ............... C03B 19/06; C03B 35/26; C03C 17/00
[52] U.S. Cl. ............................ 65/27; 65/3.12; 65/18.2; 65/32; 65/144; 65/157; 65/168; 118/733; 427/163
[58] Field of Search ............ 65/3.12, 18.2, 25.1, 65/27, 32, 144, 157, 168, 182.2; 427/163; 118/733; 425/73, 210; 264/1.2, 1.5, 1.6, 2.1, 2.7

[56] References Cited

U.S. PATENT DOCUMENTS

| | | | |
|---|---|---|---|
| 3,266,124 | 8/1966 | Lysak | 65/32 X |
| 3,351,451 | 11/1967 | Barradell-Smith et al. | 65/157 |
| 3,737,292 | 6/1973 | Keck et al. | 65/3.12 |
| 3,775,075 | 11/1973 | Keck et al. | 65/3.12 |
| 4,217,027 | 8/1980 | MacChesney et al. | 65/3.12 X |

*Primary Examiner*—Richard V. Fisher
*Attorney, Agent, or Firm*—D. J. Kirk

[57] ABSTRACT

A lightguide starting tube or rod (12) passes through opposed lateral openings (51—51) in a chamber (31) which contains an oxy-hydrogen torch (14) used to deposit particulate glass on the rod. Frusto-conical, laminar flow, gas shields (71 and 72) are formed about the rod (12) on both sides of said openings (51—51) to permit the rod to pass therethrough in spaced relation to the openings while sealing said openings to prevent gas or undeposited particulate from passing therethrough and preventing contaminants from entering the chamber (31).

14 Claims, 4 Drawing Figures

METHOD AND APPARATUS FOR FABRICATING LIGHTGUIDE PREFORMS

TECHNICAL FIELD

Broadly, the invention is directed to methods and apparatus for depositing material on a substrate while controlling the environment thereabout. In a preferred embodiment, lightguide preforms are fabricated in the controlled environment.

BACKGROUND OF THE INVENTION

It is well known in the prior art to fabricate substantially cylindrical lightguide preforms from which lightguide fibers are drawn. One such technique is set forth in U.S. Pat. No. 3,737,292, wherein a preform is fabricated by using a flame hydrolysis process to deposit a plurality of coatings of doped glass particulate on the outside peripheral surface of a cylindrical starter rod. The starter rod is then removed and the resulting substantially hollow assembly is heated and drawn to reduce the cross-sectional area and to collapse the glass assembly to form a lightguide fiber having a solid cross-sectional area.

Such a technique is referred to as an "outside" deposition process and works well. However, undeposited particulate as well as the carrier gas pass into and contaminate the atmosphere. Additionally, other contaminants in the environment proximate the preform fabrication apparatus can deleteriously effect the deposition process, resulting in a preform which yields a high loss fiber.

Accordingly, there is a need for techniques whereby lightguide preforms can be fabricated in a substantially contaminant-free environment.

SUMMARY OF THE INVENTION

The foregoing problems have been overcome by providing a chamber in which articles can be processed. Furthermore, the instant invention encompasses a method of preventing contaminants from escaping through an opening in the chamber as an elongated article passes through while in spaced relation to the periphery of the opening. The method comprises the step of directing a laminar flow, gas shield from a slit circumferential of the opening, into the chamber towards a point along the axis of the article passing therethrough.

DETAILED DESCRIPTION

The instant invention is described in terms of an exemplary embodiment in which a substantially cylindrical lightguide preform is fabricated. However, such description is for purposes of exposition and not for limitation. The instant technique can be implemented during the manufacture of any elongated article that must pass through an opening in a chamber while controlling the atmosphere therein.

Figure 1:
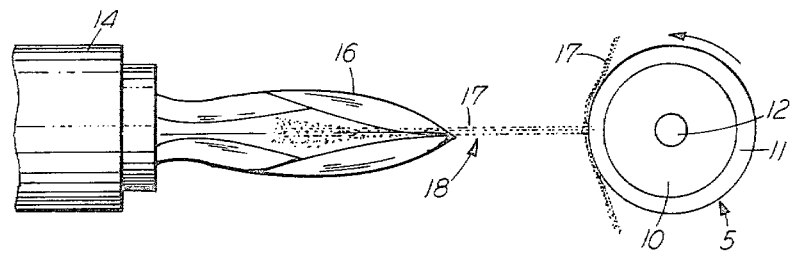
FIG. 1 is a schematic drawing of a prior art outside deposition process used to fabricate a lightguide preform.

FIG. 1 depicts a prior art technique for fabricating a lightguide preform 5 (shown in cross-section) and is set forth in detail in U.S. Pat. No. 3,737,292 which is incorporated herein by reference. A core and a cladding layer 10 and 11, respectively, having predetermined indices of refraction are applied to a substantially cylindrical glass starting tube or rod 12 by means of a flame hydrolysis burner 14. The burner 14 emits a flame 16 in which a gas-vapor mixture is hydrolized to form a glass soot 17. The soot 17 leaves the flame 16 in a stream 18 and is directed towards the starting rod 12 which is rotated while the burner 14 is translated to provide uniform deposition of the soot 17 thereon. Once sufficient soot 17 has been deposited on the rod 12 it is then sintered, the rod 12 removed and, in a separate operation, the resulting hollow cylinder is heated to an elevated temperature to simultaneously collapse and reflow one end thereof as a lightguide fiber is being drawn therefrom.

As can be seen in FIG. 1 a portion of the soot 17 does not deposite on the rod 12 and contaminates the atmosphere in the vicinity of the preform fabrication process. Additionally, other contaminants in the atmosphere may deposit on the preform 5 resulting in unacceptable high attenuation lightguide preform and fiber drawn therefrom.

Figure 2:
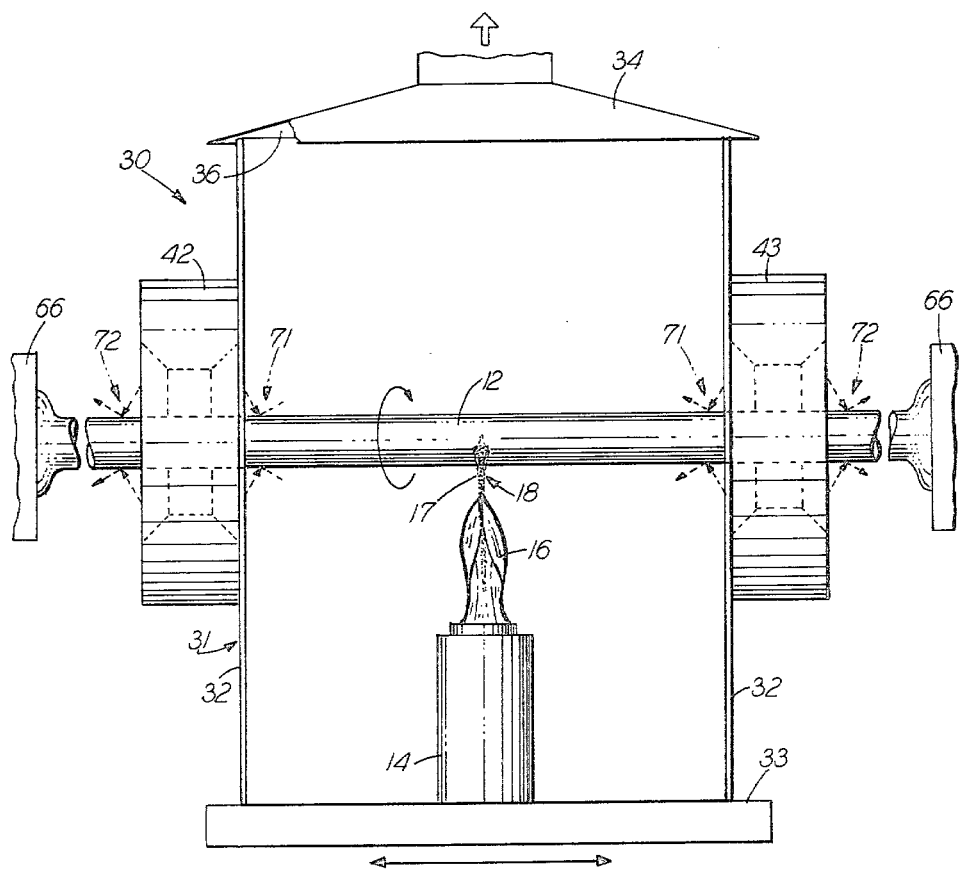
FIG. 2 is a partial cross-sectional view of the instant deposition chamber with an elongated article passing therethrough.

The instant deposition apparatus generally indicated by the numeral 30 in FIG. 2 overcomes the foregoing problems. The deposition apparatus 30 is comprised of a chamber 31 having sidewalls 32—32 mounted on a base 33 and an exhaust hood 34 on the top portion thereof. The walls 32—32 and the hood 34 have a slight spacing 36 therebetween. The base 33 of the chamber 31 sits on a bed (not shown), such as the bed of a glass lathe which is movable as indicated by the double ended arrows. The burner 14 is fixedly mounted within the chamber 31.

Figure 3:
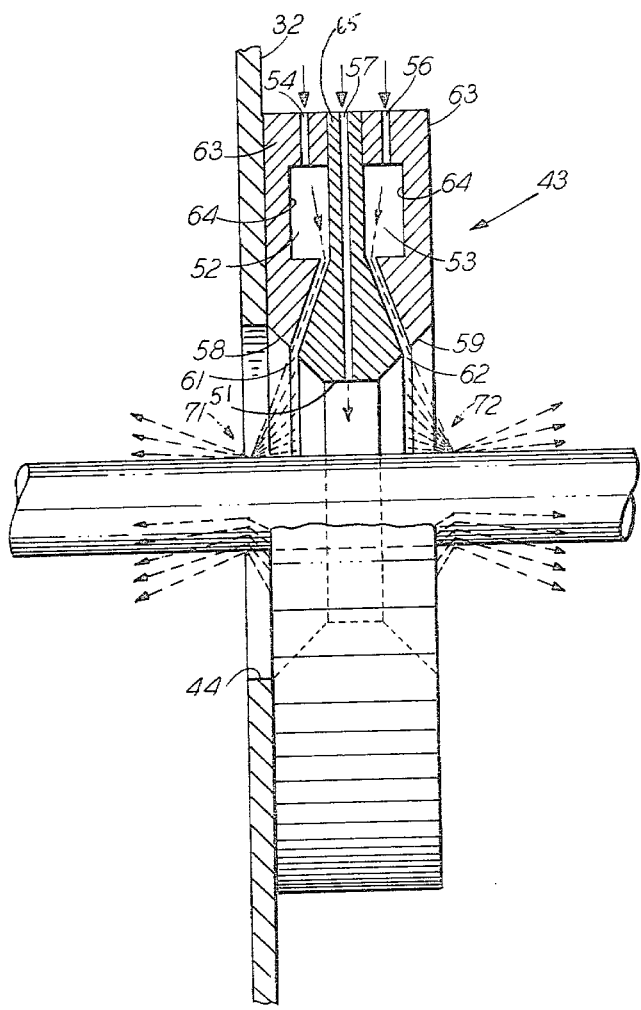
FIG. 3 is a partial cross-sectional view of a gas shield apparatus used to implement the instant invention.

First and second gas shield forming apparatus 42 and 43, respectively, are an integral part of the chamber 31 and are mounted on the sidewalls 32—32 in alignment with openings 44—44 (see FIG. 3) in the walls 32—32. The apparatus 42 and 43 are identical and the apparatus 43 is shown in detail in FIG. 3. The shield forming apparatus 43 is generally circular in cross-section with a circular central opening 51 therein. First and second substantially toroidal passageways 52 and 53, respectively, are located within the shield forming apparatus 43 such that they are concentric with the central opening 51. A pair of gas input channels 54 and 56 extend from the outer surface of the shield 43 to the passageways 52 and 53, respectively, while at least one centrally located input channel 57 extends from the outer surface to the central opening 51. The gas shield forming apparatus 43 also has first and second frusto-conical surfaces 58 and 59, respectively, which taper outwardly from the central opening 51. Angled slots 61 and 62, circumferential of the opening 51, communicate between the passageways 52 and 53, respectively, and the surfaces 58 and 59, the passageways and surfaces meeting at approximately 90°.

Advantageously, the gas shield forming apparatus 43 is formed from a three part structure comprised of a pair of mirror image outer sections 63—63 with a central section 65 interposed therebetween. The toroidal passageways 52 and 53 are formed by milling out a circular channel or groove 64 prior to joining the sections to form the apparatus 43. The channels 54, 56 and 57 are formed by drilling respective holes through the apparatus 43 from the outer surface thereof.

In operation, the cylindrical starting tube or rod 12 is passed through the central openings 51—51 in the shield forming apparatus 42 and 43 and clamped in chucks 66—66 of a conventional glass lathe (not shown). The deposition apparatus 30, which sits on the bed of the lathe repeatedly moves along the length of the rod 12 which is simultaneously rotating. The burner 14, fed from a source not shown, deposits glass soot 17 from the flame 16 onto the rod 12 as hereinbefore described. As previously indicated, some of the soot 17 from the flame 16 will not deposit on the rod 12 and will contaminate the environment. Additionally, it is desirable to prevent contaminants in the atmosphere from being deposited on the rod 12 during the lightguide preform fabrication process.

The gas shield apparatus 42 and 43 effectively prevent contaminants from entering or exiting through the openings 51—51. As the deposition apparatus 30 moves along the length of the rod 12 a gas (e.g., argon, nitrogen, oxygen or the like) flows into the passageways 52 and 53 via channels 54 and 56, respectively. The gas is then urged through the angled, circumferential, slots 61 and 62 forming first and second laminar flow gas shields 71 and 72, respectively, which are directed toward a point on the axis of the rod 12 inside the chamber 31 as well as outside the chamber as the rod passes therethrough. Advantageously, the gas may be cooled in order to promote deposition of the particulate on the rod 12 by providing a temperature difference between the deposition area and the cooled area downstream. In this embodiment the laminar flow gas shields 71 and 72 take on the geometry of a cone which becomes frusto-conical as the cylindrical rod 12 passes therethrough.

The inwardly flowing gas shields 71—71 from the gas shield forming apparatus 42 and 43 prevent any carrier gas or soot 17 from escaping to the atmosphere via the central openings 51—51. The carrier gas and soot 17 are drawn upward through the exhaust hood 34 where the gases are filtered. Additionally, the gas shields 72—72 which are directed outwardly from the shield apparatus 42 and 43 prevent airborne contaminants from entering the chamber 31. Gas fed into the central opening 51 via channel 57 and the spacing 36 through which air enters the chamber 31 are so sized as to balance pressures on both sides of each laminar flow shield 71—71 and 72—72 to prevent collapse thereof.

Most advantageously, as the diameter of the rod 12 increases during the deposition process the laminar flow frusto-conical gas shields 71 and 72 will continue their shielding function. Although the altitudes or axial height of gas shields 71 and 72 may decrease as the diameter of the rod 12 increases the frusto-conical shields 71 and 72 will be maintained while maintaining a spaced relationship between the rod and the surface of the opening 51.

Figure 4:
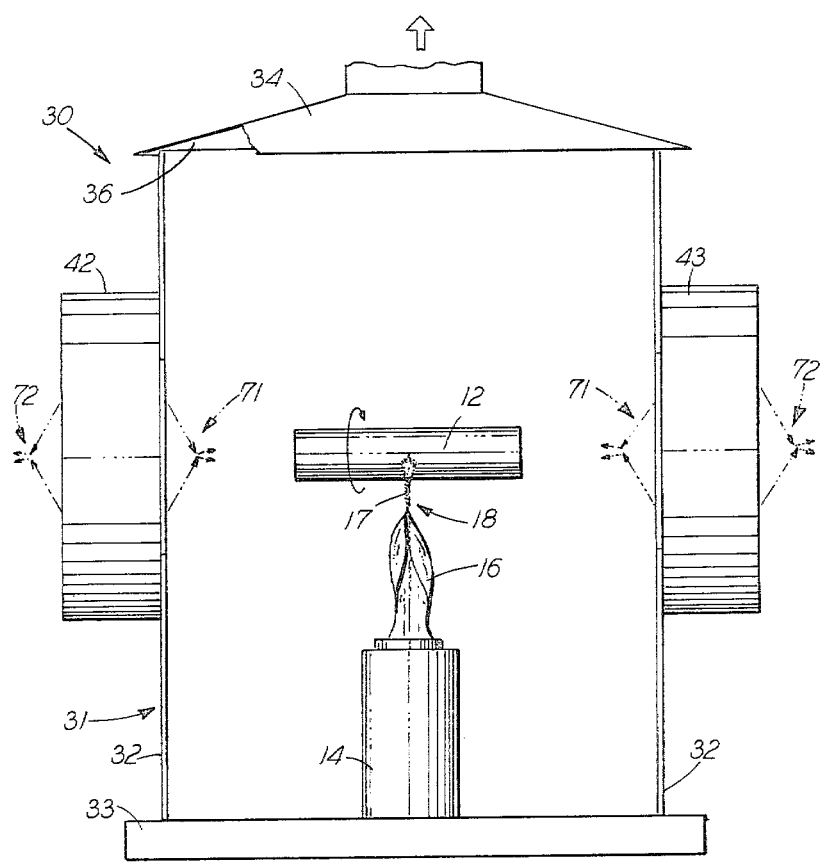
FIG. 4 is a partial cross-sectional view of the instant deposition chamber with an article being processed therein.

The instant invention can also be effective when an article is being processed or fabricated within the chamber 31 and passes through the central opening 51 at a later time. The opening 51 can be effectively kept sealed to prevent ingress and egress of contaminants by directing a conical, laminar flow, gas shield through the first and second slits 61 and 62, respectively, as shown in FIG. 4.

It is to be understood that the embodiments described herein are merely illustrative of the principles of the invention. Various modifications may be made thereto by persons skilled in the art which embody the principles of the invention and fall within the spirit and scope thereof. For example, although the exemplary embodiment forms laminar flow gas shields 71—71 and 72—72 of conical geometry for use with cylindrical articles passing through the circular openings 51—51, the instant invention is not so limited. It is also contemplated that the instant concepts can be applied to non-rotating articles having other cross-sections such as triangular, square, pentagon, etc., wherein the base of the gas shields 71—71 and 72—72 also takes on that geometry and the shield is directed towards a point along the axis of the article.

What is claimed is:

1. A method for preventing contaminants from escaping through an opening in a chamber as an elongated article passes through and in spaced relation to the periphery of the opening, the method comprising the step of:
   directing a first, laminar flow, gas shield from a first slit circumferential of the opening, into the chamber, towards a point along the axis of the article passing therethrough.

2. The method as set forth in claim 1, characterized by:
   directing a second, laminar flow, gas shield from a second slit circumferential of the opening, away from the chamber, towards a point along the axis of the article passing therethrough to prevent airborne contaminants from entering said chamber.

3. The method as set forth in claim 1, wherein:
   the article is a cylindrical lightguide preform.

4. The method as set forth in claim 1, wherein:
   the article rotates and translates relative to the opening.

5. The method as set forth in claim 1, wherein:
   the article reciprocates relative to the opening; and
   the diameter of the article increases upon each reciprocation.

6. The method as set forth in claim 2, wherein:
   the outer cross-sectional geometry of the article and the geometry of the first and second slits are similar.

7. The method as set forth in claim 1 which is characterized by:
   cooling the gas which is used to form the shield.

8. A method of preventing gaseous contaminants, containing particulate matter therein, from passing through an opening in a chamber, the method comprising the step of:
   directing a first laminar flow, gas shield through a first slit circumferential of the opening in such a manner that the slit forms the base of the gas shield having an apex within the chamber.

9. The method as set forth in claim 8, characterized by:
   directing a second, laminar flow, gas shield through a second slit circumferential of the opening, away from the chamber, in such a manner that the slit forms the base of the gas shield having an apex outside the chamber to prevent airborne contaminants from entering the chamber.

10. The method as set forth in claim 9, wherein:
    the first and second slits are circular; and the laminar flow gas shield has a conical shape.

11. An apparatus for preventing contaminants from escaping through an opening in a chamber as an elongated article passes through and in spaced relation to the periphery of the opening, the apparatus comprising:
means for directing a first, laminar flow gas shield from a first slit circumferential of the opening, into the chamber, towards a point along the axis of the article passing therethrough.

12. The apparatus as set forth in claim 11, comprising:
means for directing a second, laminar flow, gas shield from a second slit circumferential of the opening, away from the chamber toward a point along the axis of the article passing therethrough to prevent airborne contaminants from entering said chamber.

13. An apparatus for preventing gaseous contaminants, containing particulate matter therein, from passing through an opening in a chamber, the apparatus comprising:
means for directing a first conical, laminar flow, gas shield through a circular slit circumferential of the opening in such a manner that the slit forms the base of the conical gas shield and the apex thereof is within the chamber.

14. The apparatus as set forth in claim 13, comprising:
means for directing a second conical, laminar flow, gas shield through a circular slit circumferential of the opening, away from the chamber, in such a manner that the slit forms the base of the conical gas shield and the apex thereof is outside the chamber, to prevent airborne contaminants from entering the chamber.

* * * * *